Figure 1:
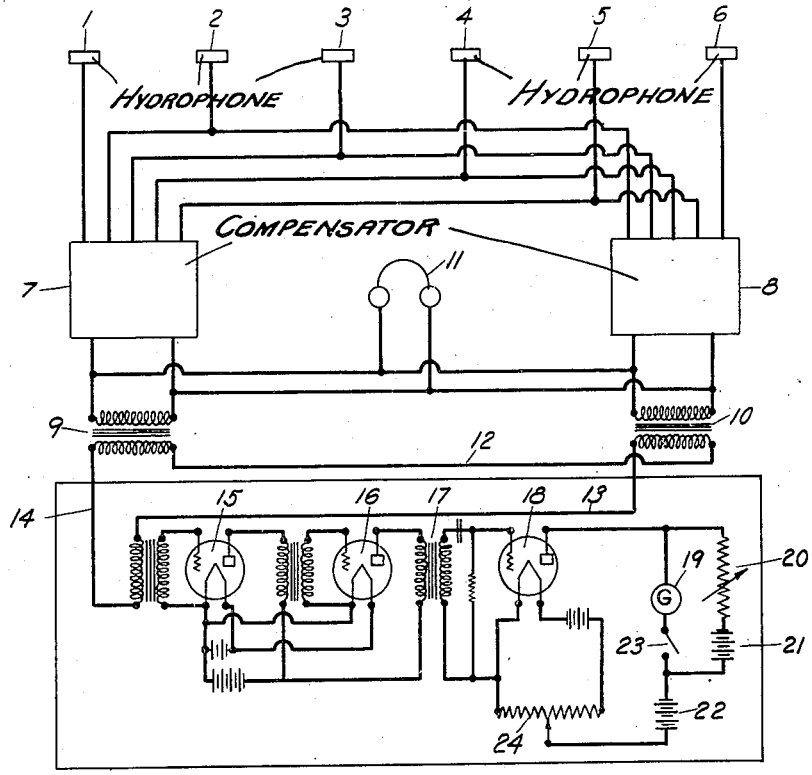

May 19, 1936.  B. R. HUBBARD  2,040,850
METHOD AND APPARATUS FOR THE DETERMINATION
OF DIRECTION OF A SOURCE OF WAVE ENERGY
Filed Dec. 20, 1923

Inventor
Beverly R. Hubbard
by Ezekiel Wolf
Attorney

Patented May 19, 1936

2,040,850

UNITED STATES PATENT OFFICE

2,040,850

METHOD AND APPARATUS FOR THE DETERMINATION OF DIRECTION OF A SOURCE OF WAVE ENERGY

Beverly R. Hubbard, Melrose, Mass., assignor to Submarine Signal Company, Boston, Mass., a corporation of Maine Application December 20, 1928, Serial No. 327,450

7 Claims. (Cl. 177—386)

The invention of the present application concerns the determination of the direction of a source of sound, particularly systems for the determination of the direction of a source of sound in which compensators are employed. The invention provides a visual indicator for use with the compensator.

The direction of a source of sound is determined with a compensator by introducing time retardation by means of paths of variable length between the sound receivers and the indicating device. The lengths of these paths are varied until the sound impulses from the two groups of sound receivers reach the indicating device at the same time. In other words the compensator is a device for bringing into phase the sound impulses from two groups of sound receivers. The indicating device must therefore be a device to indicate when two impulses are in phase.

The usual manner of determining when the impulses are in phase is to employ a telephone head set. This may be used according to either of two methods, known as the binaural and maximum methods, respectively.

In the binaural method, the sound impulses, having been conducted separately through the compensator, are led to the left and right ears respectively. When the impulses from the two groups reach the left and right ears at the same time, the sound image appears to be central and the compensator is said to be binaurally focused.

In the maximum method, the impulses from the two groups of receivers, after having been conducted separately through the compensator, are intermingled before being led to the ears. When the impulses are in phase, the sound heard in the receivers will be of greatest intensity, or a maximum.

It is evident that the indicating device, in any case, must be one which will indicate when two impulses are in phase.

The usual methods of determining when the two sets of impulses are in phase by the use of telephones, as discussed above, have several serious disadvantages. The binaural method, though quite accurate, requires an experienced observer whose binaural sense has been carefully trained through much practice. Such trained observers are difficult to secure and often not at hand when wanted. With the maximum method, a trained observer is not required, since practically anyone with normal hearing can tell when a sound reaches maximum intensity. However, the maximum method is not so accurate because the maximum is not a sharply defined point, but when the point at which the two sets of impulses are in phase is approached, the compensator may be varied through a considerable range without effecting any appreciable change in the intensity of the sound in the telephones.

A further method of using telephone receivers as phase indicators is known as the minimum method. In the minimum method, the impulses, after having passed through the compensator, are opposed to one another in such a manner that when the compensator is properly adjusted, the impulses from the two groups of receivers annul one another and no sound is heard in the head phones. This method has been seldom used in practice for the reason that as the proper compensator setting is approached, the sound disappears. It is then impossible to tell whether the minimum setting has been obtained or whether the signal being listened to has for one reason or another disappeared, or whether a defect has developed in the system.

To overcome the disadvantages of all these methods employing telephone receivers as phase indicating devices, and to provide a more accurate method of setting the compensator, this invention provides a method combining an indication of the minimum setting of the compensator with a coincident indication of the existence of the signal being observed.

The invention further provides apparatus to carry out this method, comprising means for indicating the point of minimum compensator setting and means for coincidently observing the signal.

The minimum setting of the compensator may be ascertained through the use of telephone receivers, the continuance of the signal being shown at the same time by a visual indicator. In this case the visual indicator may be arranged to show a maximum. On the other hand, the minimum compensator setting may be visually indicated, and the signal itself aurally followed by means of telephones. In this case the telephones may be arranged to indicate a maximum or a maximum combined with binaural when the visual indicator shows a minimum.

Further details of the invention may be ascertained by reference to the drawing, in which Figure 1 shows diagrammatically six receivers arranged with four of these common to both paths of the compensator. It also shows telephone receivers connected to indicate a maximum when the compensator is focused and a form of visual indicator connected to show a minimum.

Figure 2:
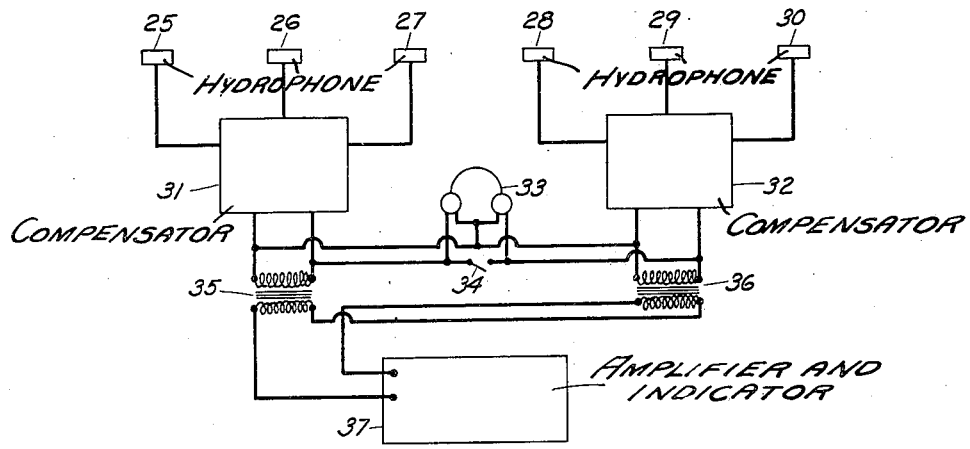

Figure 2 shows diagrammatically six receivers, of which three are connected to each of the two paths of the compensator respectively. It also shows telephone receivers connected to indicate a simultaneous maximum and binaural combined.

Referring now to Figure 1 of the drawing, six sound receivers are shown, 1, 2, 3, 4, 5, 6. Of these, 1, 2, 3, 4, and 5 form the left base and 2, 3, 4, 5 and 6 the right base. The impulses received by the left base receivers are conducted to one path 7, of the compensator; those received by the right base to the other path 8 of the compensator. The output terminals of retardation lines 7 and 8 are connected to the primaries of transformers 9 and 10 respectively. The secondaries of transformers 9 and 10 are connected in series, opposing by means of conductor 12.

Conductors 13 and 14 connect the output of transformers 9 and 10 to the two stage amplifier containing tubes 15 and 16. The output of amplifying tube 16 is led by means of transformer 17 to the grid of the detector tube 18. The plate current of tube 18 is visually indicated by galvanometer or other visual indicator 19, when the switch 23, which may be provided, is closed. The plate current may be adjusted by varying the plate potential supplied by battery 22 by adjustment of variable resistance 24. The steady plate current of the tube 18, when no signal is being received, would ordinarily cause a deflection of galvanometer 19. This would render the instrument rather insensitive to the current due to the signal, since the latter is of the order of microamperes, while the steady plate current is of the order of milliamperes. Therefore, the steady plate current which would flow in the plate circuit even though no signal were being received, may be substantially annulled by supplying an equal potential in the opposite direction. This may be done by shunting the galvanometer with a battery 21 and an adjustable resistance 20 in series.

Telephone receivers 11 are connected in parallel to the output of the compensating lines 7 and 8.

With the apparatus connected as shown in Figure 1, the sound produced by the telephones will be a maximum when the compensator is properly adjusted, while the galvanometer or visual indicator 19 will show a minimum value. Thus the benefits of the minimum method of focusing the compensator may be obtained, while at the same time the signal being observed may be listened to and identified by means of the telephones 11, whereby any doubts as to the continued existence and the identity of the signal whose direction is being determined are removed.

The six receivers shown in Figure 2 are divided into two groups of three each. Each group is connected to its respective retardation line 31 and 32, the outputs thereof being connected to the primaries of transformers 35 and 36. The secondaries of these transformers are connected in series opposing and to an amplifier and visual indicator schematically shown at 37 and similar to that shown in Figure 1. The telephone receivers 33 are connected to produce a binaural effect when the switch 34 is open. When the switch 34 is closed, the telephones 33 indicate a maximum. The arrangement shown in Figure 2 is, however, usually used with switch 34 open. For the maximum indication in the telephones, the arrangement of receivers 1 to 6, as shown in Figure 1, is preferable.

With the arrangements shown, the visual indicator in either figure would indicate a minimum when the compensator is focused. By reversing the connections to the secondary of transformers 10 or 36, the respective galvanometers may be made to indicate a maximum.

Alternatively, in Figure 1 the amplifier and indicator may be interchanged with the telephones, in which case the galvanometer will indicate a maximum and the telephones a minimum. It is also possible to use the visual indicator alone, connected either to show a maximum or a minimum, without using the telephones. This has the advantage of leaving the ears free for conversation.

It is understood that arrangements of sound receivers or forms of indicator other than those shown in the drawing may be used without departing from the spirit of the invention.

What I claim is:

1. Apparatus for determining the direction of a source of sound including a plurality of sound receivers divided into two groups, compensating means for bringing the impulses received by each group into phase, and means for indicating the same, means for reversing the phase of the impulses from one of said groups and visual indicating means connected to said phase reversing means for indicating when the impulses of the two groups are in phase opposition.

2. Apparatus for the determination of the direction of a source of sound comprising two groups of sound receivers for receiving the impulses whose direction is to be determined; means connected with said receivers for introducing relative time retardation into the paths of said received impulses to bring the impulses into phase, means associated with said first means for aurally indicating the identity and continued existence of the sound source, means simultaneously operative with said aural indicating means for opposing the impulses from the two groups of receivers against one another and visual indicating means for indicating when said opposed impulses are in phase.

3. Apparatus for determining the direction of a source of sound comprising two groups of receivers of sound waves adapted to convert the waves to electric impulses, two variable retardation lines operatively connected to said receivers for bringing the impulses of each of said groups into phase, a pair of transformers each having its primary connected to the end of one of said retardation lines respectively, the secondaries of said transformers being connected in series opposing, an amplifier connected to the secondaries of said transformers and means for measuring the current output of said amplifier.

4. Apparatus for determining the direction of a source of sound comprising two groups of receivers of sound energy, means for bringing the energy received by the several receivers into phase, means for aurally indicating the identity and continued existence of the sound source, means for opposing a portion of the energy to produce a minimum and means for visually indicating said minimum.

5. The method of determining the direction of a source of wave energy comprising receiving the wave impulses whose direction is to be determined, transmitting the impulses to an indicating device, introducing relative time retardation means into the paths of said transmitted impulses, producing simultaneously an audible and a visual indication of the transmitted impulses, varying the time retardation to produce a minimum audible signal in the presence of a continued visual indication of the signal.

6. The method of determining the direction of a source of wave energy comprising receiving the wave impulses whose direction is to be determined, transmitting the impulses to an indicating device, introducing relative time retardation means into the paths of said transmitted impulses, producing simultaneously an audible and a visual indication of the transmitted impulses, varying the time retardation to produce a minimum visual indication in the presence of a continued audible signal.

7. The method of determining the direction of a source of sound waves which consists in receiving the incident sound impulses at two groups of spaced points, converting said impulses into corresponding electric impulses, transmitting said impulses over paths of relatively different time length, combining a portion of the energy of the two groups of impulses in an additive manner and the remainder in a subtractive manner, simultaneously producing an audible indication of the additively combined energy and a visible indication of the subtractively combined energy while varying the time length of the said paths until the impulses are in phase.

BEVERLY R. HUBBARD.